United States Patent [19]

Citelli

[11] 4,283,069

[45] Aug. 11, 1981

[54] MULTIPLE SPEED BICYCLE DRIVE

[76] Inventor: Kenneth J. Citelli, 258 Banner Ave., Ventura, Calif. 93003

[21] Appl. No.: 119,949

[22] Filed: Feb. 8, 1980

[51] Int. Cl.³ .................. B62M 9/12; B62M 11/14
[52] U.S. Cl. .................................... 280/236; 474/72
[58] Field of Search .................. 280/236, 237, 238; 474/69, 72, 80, 81

[56] References Cited

FOREIGN PATENT DOCUMENTS 2458871 6/1975 Fed. Rep. of Germany ........... 280/236
530913 12/1940 United Kingdom ..................... 474/80

Primary Examiner—John A. Pekar
Attorney, Agent, or Firm—Jack C. Munro

[57] ABSTRACT

In combination with a conventional multiple speed bicycle wherein a series of innerconnected sprockets, which connect with the driving chain from the bicycle pedal assembly, are mounted exteriorly of the hub of the driving wheel. These multiple sprockets are part of what is termed as a derailleur mechanism (gear changing mechanism). This derailleur mechanism functions such that the operator can more easily pedal the bicycle at lower speeds and at higher speeds. This derailleur mechanism is only changeable when the bicycle is moving. The second type of gear changing mechanism is to be incorporated with the hub of the driving wheel and is operable primarily when the bicycle is at rest. The second gear changing permits a change of gears when the bicycle is stopped so as to make it easier to accelerate the bicycle from the at-rest position.

1 Claim, 5 Drawing Figures

MULTIPLE SPEED BICYCLE DRIVE

BACKGROUND OF THE INVENTION

The field of this invention relates to bicycles and more particularly to a mechanism to vary the force required through the pedal assembly in order to operate the bicycle, not only when the bicycle is moving, but also when the bicycle is stopped.

The use of the derailleur mechanism within a bicycle is, at the present time, quite common. The derailleur mechanism permits shifting of the bicycle into "lower gear", such as when going up hill or when moving slowly. This is very satisfactory in most instances. But, there is one disadvantage in that the bicycle must be moving before changing of the gears is possible.

One disadvantage to this is if an operator, as he approaches a stop situation, is in a "high gear", the operator may experience difficulty in getting moving again until the operator is able to shift gears by the derailleur mechanism. This situation could be hazardous and to practically everyone who has operated such a bicycle, it certainly is annoying.

There is a definite need for the incorporating of a shifting mechanism with a bicycle which is operable while the bicycle is standing still.

SUMMARY OF THE INVENTION

The bicycle of this invention includes a driving wheel which has an enlarged hub. Within the enlarged hub is located a gear changing mechanism which can be manually operated to shift gears while the bicycle is standing still. The shifting mechanism is to be attached to the handle bars of the bicycle. Exteriorly of the hub is a conventional derailleur gear shifting mechanism. This gear shifting mechanism is to be operable only when the bicycle is moving.

The primary advantage of the structure of this invention is to incorporate a means to shift gears of the bicycle in any mode of operation of the bicycle, whether it is standing still or moving.

DETAILED DESCRIPTION OF THE SHOWN EMBODIMENT

Figure 1:
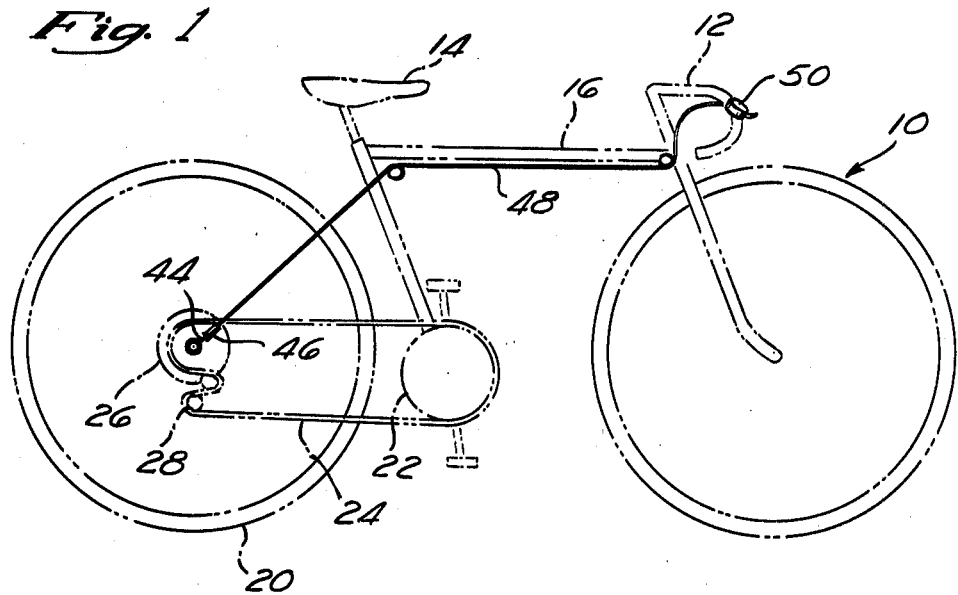
FIG. 1 is a side view of a conventional bicycle (shown in phantom) within which is incorporated the gear changing mechanism of this invention.
Figure 2:
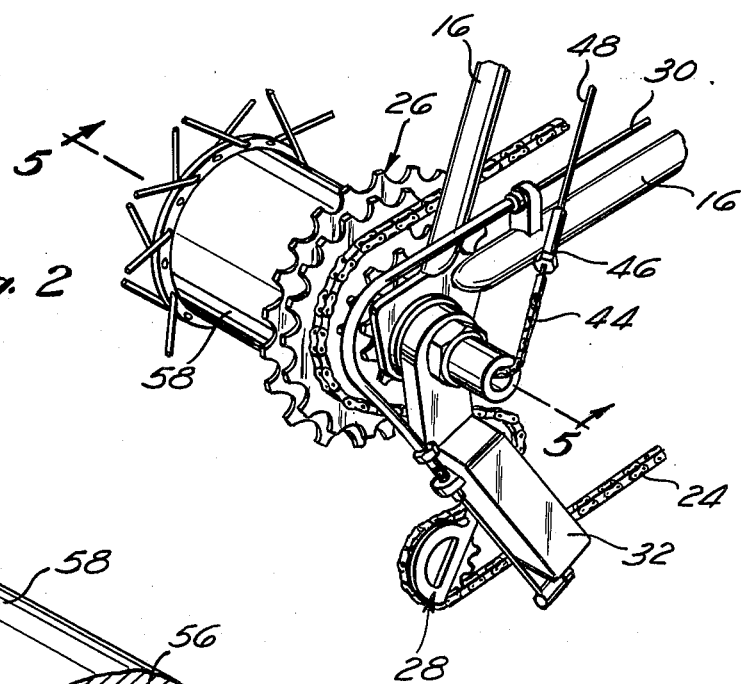
FIG. 2 is an isometric view of the hub portion of the driving wheel within the bicycle of FIG. 1.
Figure 3:
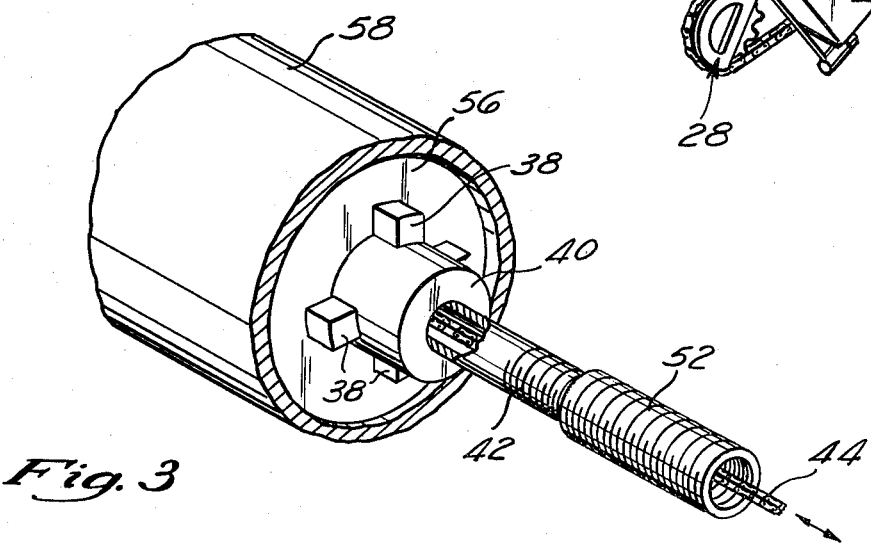
FIG. 3 is an isometric view, partially in cross-section, of the hub portion of the driving wheel of the bicycle with the derailleur mechanism eliminated.
Figure 4:
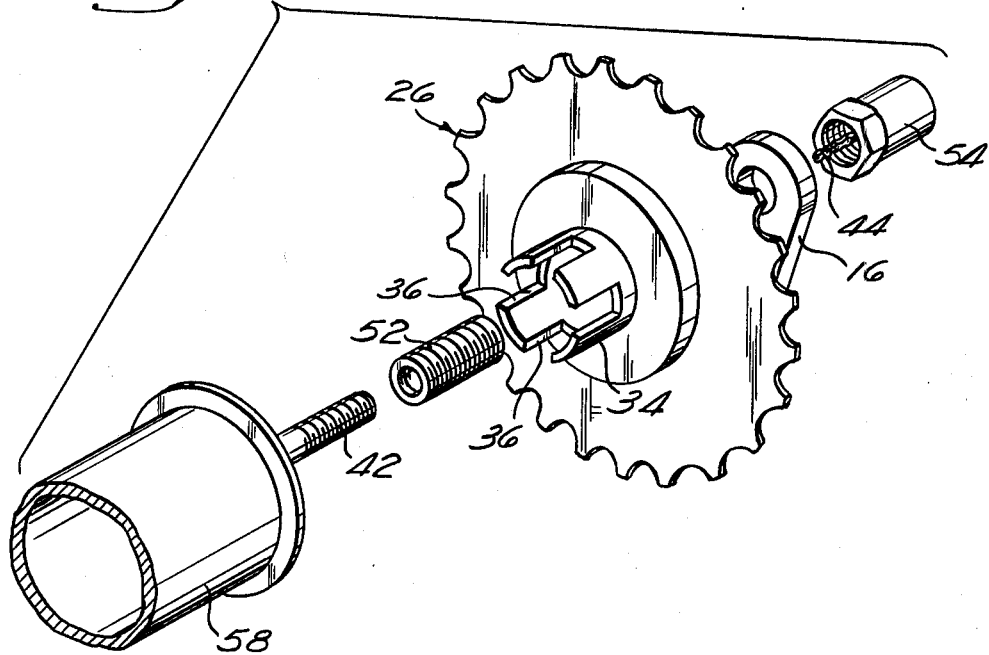
FIG. 4 is an exploded isometric view of the hub of the bicycle of this invention showing the back side of the sprocket assembly which is contained within the derailleur.
Figure 5:
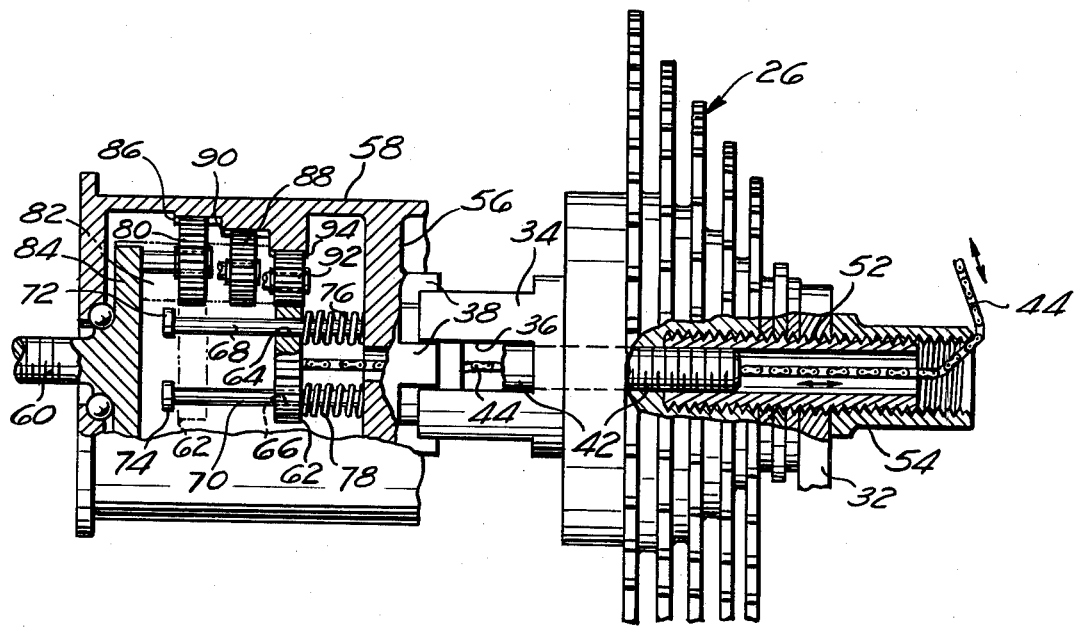
FIG. 5 is a cutaway, partially in cross-section, side view through the hub of the driving wheel of the bicycle of this invention.

Referring particularly to the drawings, there is shown in FIG. 1 a conventional bicycle 10 which has handle bars 12, a seat 14, frame 16, a front wheel 18 and a driving wheel 20. Attached to the frame 16 is a pedal assembly (not shown) which operates through a driving sprocket 22 to operate a chain 24. The chain 24 is connected with a first gear changing mechanism which takes the form of an innerconnected single unit of different sized sprockets 26 and an idler mechanism 28. The idler mechanism 28 is to function to maintain the chain 24 taut whether the chain 24 is engaged with any sized sprocket of the sprocket assembly 26. The function of the idler mechanism 28 is deemed to be conventional and forms no specific part of this invention, in and of itself.

The moving of the chain from one sprocket to another sprocket of the sprocket assembly 26 is accomplished by laterally moving (with respect to the driving wheel 20) the idler mechanism 28. This lateral movement of the idler mechanism 28 is caused by manually operating from the handle bars 12 a wire 30, which in turn is connected to an actuator assembly 32 located adjacent the idler mechanism 28. It is to be understood that this type of gear changing mechanism is to effect shifting of the gears only during the time that the bicycle is moving.

The sprocket assembly 26 has attached on its rear surface thereof a cylinder 34 which includes four in number of spaced-apart slots 36. Each of the slots 36 is to connect with a lug 38 which is attached on a cylindrical sleeve 40. Extending centrally through the cylindrical sleeve 40 is shaft 42. The shaft 42 is hollow and has an operating chain 44. The chain 44 is connected through a connector 46 to a cable 48. The cable 48 is attached to a manually operated gear shift lever mechanism 50 which is mounted directly on the handle bars 12 of the bicycle.

The shaft 42 has threadedly secured on its outer end thereof a shaft extension 52. The reason for this shaft extension 52 is so as to cause the overall length of the shaft to be sufficient to extend through the sprocket assembly 26 and to engage with securing nut 54. It is to be understood that the cable 44 passes through both the securing nut 54 and the shaft extension 52.

Each of the lugs 38 are integrally attached to a plate 56. The plate 56 is mounted interiorly of a hub housing 58 of a hub assembly. In alignment with the shaft 34 and located on the opposite side of hub housing 58 extends a shaft 60. The shaft 60 is adapted to remain fixed, as well as the shaft 42. Cylinder 40 is rotatably mounted with respect to the shaft 42.

It is to be understood that the shaft 60 and the shaft extension 52 are both secured to the frame 16 of the bicycle.

The chain 44 is centrally and low frictionally mounted to a drive gear 62 which is mounted within the hub housing 58. The drive gear 62 has a pair of spaced-apart openings 64 and 66. Slidably mounted within the opening 64 is a rod 68. A similar rod 70 is slidably mounted within the rod 66. The inner end of each of the rods 68 and 70 are fixedly secured to the inner surface of the plate 56. The outer end of the rod 68 includes an enlarged section 72 with a similar enlarged section 74 being formed at the outer end of the rod 70.

Located about the rod 68 and in between the gear 62 and the plate 56 is a biasing spring 76. A similar biasing spring 78 is located about the rod 70 and between the gear 62 and the plate 56. The biasing springs 76 and 78 tend to exert a continuous bias tending to locate the gear 62 against the enlarged portions 72 and 74. This would be the direct drive position of the gear 62. As will be explained further on in the specification, movement of the gear 62 from this position toward the plate 56 results in a "gearing down" situation.

The gear 62 in its direct drive situation is to operatively connect with a driven gear 80. It is to be understood that there will normally be four in number of driven gears 80 located in a planet configuration about the drive gear 62. These planet gears 80 are rotatably supported in a cage 82. This cage 82 is fixedly mounted to a plate 84 which in turn is fixed to the shaft 60. Each of the planet gears 80 are in continuous engagement with a first ring gear 86 which is integrally formed with the hub housing 58. The hub housing 58 is secured to and is part of the driving wheel 20.

Movement of the gear 62 to the intermediate position toward the plate 56 causes the gear 62 to operatively engage with a series of planet gears 88 which are also rotatably supported within the cage 82. It is to be noted that the size of the gear 88 is somewhat smaller than the size of the gears 80. Each of the gears 88 is to be in continuous operative engagement with a ring gear 90 which is integral with the housing 58. It is to be noted that the diameter of the ring gear 90 is somewhat smaller than the diameter of the ring gear 86.

In a similar manner, upon the drive gear 62 being moved still further toward the plate 56, the gear 62 will operatively engage with a series of planet gears 92 which are similarly rotatably supported within a cage 82. These planet gears 92 are to be in continuous operative engagement with the ring gear 94 which is integral with the housing 58.

In operating of the bicycle 10 of this invention, with the bicycle 10 stopped, the operator only needs to manually move the shift lever 50 to cause movement of the chain 44. This movement of the chain 44 causes the gear 62 to engage either planet gears 80 of planet gears 88 or planet gears 92. The result is a shifting occurs with permits the bicycle to be located in different speed ratios. If the gear 62 is in engagement with the planet gears 92, this would be the normal situation when moving away from an at-rest position. When the bicycle is driven at normal cruise speed, the gears 62 should be in engagement with the planet gears 80. An intermediate speed position would be with the driving gear 62 in engagement with the planet gears 88.

What is claimed is:

1. In combination with a bicycle, said bicycle having a driving wheel which is to be rotatable driven by a manually operated pedal assembly, said manually operated pedal assembly operating through a chain, said driving wheel having a central hub assembly, the improvement comprising:

first and second gear changing mechanisms, said first gear changing mechanism connected to said second gear changing mechanism and located exteriorly thereof, said first gear changing mechanism comprising a plurality of connected different sized sprockets, said chain connected to said sprockets, said first gear changing mechanism to be manually operable to change from one of said sprockets to another of said sprockets to thereby change the ratio of the number of revolutions of said pedal assembly to the number of revolutions of said driving wheel; and said second gear changing mechanism being mounted within said hub and in driving relationship therewith, said second gear changing mechanism to be manually operable to also change the ratio of the number of revolutions of said pedal assembly to the number of revolutions of said driving wheel, said second gear changing mechanism being operated independent of said first gear changing mechanism, said second gear changing mechanism being operable primarily when said bicycle is stationary while said first gear changing mechanism being operable only when said bicycle is moving.

* * * * *